US012785416B2

(12) United States Patent
Cui et al.

(10) Patent No.: US 12,785,416 B2
(45) Date of Patent: Nov. 3, 2026

(54) COMPACT, ACCURATE, AND EFFICIENT BATTERY-CHARGING CMOS VOLTAGE REGULATOR

(71) Applicant: Georgia Tech Research Corporation, Atlanta, GA (US)

(72) Inventors: Linyuan Cui, Atlanta, GA (US); Gabriel Alfonso Rincon-Mora, Atlanta, GA (US); Qian Zhi, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 701 days.

(21) Appl. No.: 18/144,603

(22) Filed: May 8, 2023

(65) Prior Publication Data

US 2024/0204557 A1 Jun. 20, 2024

Related U.S. Application Data

(60) Provisional application No. 63/433,901, filed on Dec. 20, 2022.

(51) Int. Cl.
*H02J 7/00* (2026.01)
*H02J 7/24* (2006.01)

(52) U.S. Cl.
CPC ............. *H02J 7/24* (2013.01); *H02J 2207/20* (2020.01)

(58) Field of Classification Search
USPC ........................................................ 320/107
See application file for complete search history.

(56) References Cited

U.S. PATENT DOCUMENTS

| | | | | |
|---|---|---|---|---|
| 4,016,473 A * | 4/1977 | Newman | H02J 7/927 320/140 |
| 10,594,152 B1 * | 3/2020 | Zhao | H02J 7/865 |
| 2016/0056663 A1 * | 2/2016 | Deng | H02J 7/02 320/108 |

OTHER PUBLICATIONS

E. Babaei and O. Abbasi, "A new topology for bidirectional multi-input multi-output buck direct current-direct current converter," International Transactions on Electrical Energy Systems, vol. 27, No. 2, p. e2254, Feb. 1, 2017 2017, doi: 10.1002/etep.2254.

M. Dhananjaya, D. Ponuru, T. S. Babu, B. Aljafari, and H. H. Alhelou, "A New Multi-Output DC-DC Converter for Electric Vehicle Application," IEEE Access, vol. 10, pp. 19072-19082, Jan. 1, 2022 2022, doi: 10.1109/access.2022.3151128.

(Continued)

*Primary Examiner* — Samuel Berhanu
(74) *Attorney, Agent, or Firm* — Meunier Carlin & Curfman LLC

(57) ABSTRACT

A battery-charging voltage regulator includes an inductor in series with a battery, an output terminal $V_O$ selectively electrically connectable to the battery $V_B$; and an input terminal $V_{LN}$ selectively electrically connectable to an input of the inductor $L_X$. The connections are such that the inductor always drains to the output. The device can include a battery supply mode, a charge supply mode, and an input-supplied mode depending on switching with the device, which in one aspect, can be implement in metal oxide semiconductors.

28 Claims, 10 Drawing Sheets

(56) References Cited

OTHER PUBLICATIONS

J.-Y. Kim, B.-S. Lee, S.-H. Lee, J.-H. Ahn, and J.-K. Kim, "Integrated Single Inductor Converter for a DC Grid System Connected With Battery and Load," IEEE Transactions on Industrial Electronics, vol. 68, No. 12, pp. 12010-12020, Dec. 2021//2021, doi: 10.1109/TIE.2020.3047062.

H. Shao, X. Li, C.-Y. Tsui, and W.-H. Ki, "A Novel Single-Inductor Dual-Input Dual-Output DC-DC Converter With PWM Control for Solar Energy Harvesting System," IEEE Transactions on Very Large Scale Integration (VLSI) Systems, vol. 22, No. 8, pp. 1693-1704, Aug. 2014// 2014, doi: 10.1109/TVLSI.2013.2278785.

Y.-H. Lam, W.-H. Ki, C.-F. Tsui, and P. K. T. Mok, "Single-inductor dual-input dual-output switching converter for integrated battery charging and power regulation," in 2003 IEEE International Symposium on Circuits and Systems (ISCAS), May 2003// 2003, vol. 3, pp. III-III, doi: 10.1109/ISCAS.2003.1205052. [Online]. Available: files/239/1205052.html.

J.-H. Jung, Y.-H. Jung, S.-K. Hong, and O.-K. Kwon, "A High Peak Output Power and High Power Conversion Efficiency SIMIMO Converter Using Optimal on-Time Control and Hybrid Zero Current Switching for Energy Harvesting Systems in IoT Applications," IEEE Transactions on Power Electronics, vol. 35, No. 8, pp. 8261-8275, Aug. 2020// 2020, doi: 10.1109/TPEL.2019.2963513.

P.-C. Huang and T.-H. Kuo, "A Reconfigurable and Extendable Single-Inductor Single-Path Three-Switch Converter for Indoor Photovoltaic Energy Harvesting," IEEE Journal of Solid-State Circuits, vol. 55, No. 7, pp. 1998-2008, Jul. 2020// 2020, doi: 10.1109/JSSC2020.2987722.

D. El-Damak and A. P. Chandrakasan, "A 10 nW-1 μW Power Management IC With Integrated Battery Management and Self-Startup for Energy Harvesting Applications," IEEE Journal of Solid-State Circuits, vol. 51, No. 4, pp. 943-954, Apr. 2016// 2016, doi: 10.1109/JSSC2015.2503350.

I. C. Chen, C.-W. Liang, and T.-H. Tsai, "A Single-Inductor Dual-Input Dual-Output DC-DC Converter for Photovoltaic and Piezoelectric Energy Harvesting Systems," IEEE Transactions on Circuits and Systems II: Express Briefs, vol. 66, No. 10, pp. 1763-1767, Oct. 2019// 2019, doi: 10.1109/TCSII.2019.2921349.

A. Manthiram, "An Outlook on Lithium Ion Battery Technology," ACS Central Science, vol. 3, No. 10, pp. 1063-1069, Oct. 25, 2017 2017, doi: 10.1021/acscentsci.7b00288.

F. He, "USB Port and power delivery: An overview of USB port interoperabiliy," in 2015 IEEE Symposium on Product Compliance Engineering (ISPCE), May 1, 2015 2015: IEEE, doi: 10.1109/ispce.2015.7138710.

J. Xiong et al., "Failure detection for over-discharged Li-ion batteries," in 2012 IEEE International Electric Vehicle Conference, Mar. 1, 2012 2012: IEEE, doi: 10.1109/ievc2012.6183238.

R. Guo, L. Lu, M. Ouyang, and X. Feng, "Mechanism of the entire overdischarge process and overdischarge-induced internal short circuit in lithium-ion batteries," Scientific Reports, vol. 6, No. 1, p. 30248, Sep. 1, 2016 2016, doi: 10.1038/srep30248.

H. A. Wheeler, "Formulas for the Skin Effect," Proceedings of the IRE, vol. 30, No. 9, pp. 412-424, Sep. 1, 1942 1942, doi: 10.1109/jrproc 1942.232015.

J. D. Cockcroft, "Skin effect in rectangular conductors at high frequencies," Proceedings of the Royal Society of London. Series A, Containing Papers of a Mathematical and Physical Character, vol. 122, No. 790, pp. 533-542, Feb. 1, 1929 1929, doi: 10.1098/rspa.1929.0038.

G. Antonini, A. Orlandi, and C. R. Paul, "Internal impedance of conductors of rectangular cross section," IEEE Transactions on Microwave Theory and Techniques, vol. 47, No. 7, pp. 979-985, Jul. 1, 1999 1999, doi: 10.1109/22.775429.

K. Venkatachalam, C. R. Sullivan, T. Abdallah, and H. Tacca, "Accurate prediction of ferrite core loss with nonsinusoidal waveforms using only Steinmetz parameters," in 2002 IEEE Workshop on Computers in Power Electronics, 2002. Proceedings.: IEEE, doi: 10.1109/cipe.2002.1196712.

K. Gorecki and K. Detka, "Analysis of influence of losses in the core of the inductor on parameters of the buck converter," in 2018 Baltic URSI Symposium (URSI), May 1, 2018 2018: IEEE, doi: 10.23919/ursi.2018.8406725.

* cited by examiner

COMPACT, ACCURATE, AND EFFICIENT BATTERY-CHARGING CMOS VOLTAGE REGULATOR

CROSS REFERENCE TO RELATED APPLICATIONS

This application is a non-provisional of and claims priority benefit of U.S. Provisional Patent Application Ser. No. 63/433,901, filed Dec. 20, 2022, pending, which application is hereby incorporated by this reference in its entirety for all purposes as if fully set forth herein.

BACKGROUND

Field

Embodiments of the present invention relate to switched-inductor power supply systems, specifically a battery charging system in which a battery and a load are in series.

Background

A battery-charging voltage regulator is a power supply system that can charge a battery and supply a load at the same time. Switched-inductor power supply systems deliver power with an inductor, transferring energy into and taking energy from the inductor by periodically energizing and draining it. An inductor energizes with a positive voltage across it, defined as a voltage that drops in the same direction as the current flow. It drains, then, with a negative voltage. Inductor current $i_L$ ramps up and down with the voltage across it, signifying its energy transfer process, as shown in FIG. 1. FIG. 1 shows an inductor current waveform in continuous conduction mode (CCM).

Referring to FIG. 1, in CCM, the inductor current does not fall to zero during operation. In one switching period of a switched-inductor power supply, the inductor typically completes one energizing and one draining event. The energizing duty cycle $d_E$ is therefore the time it takes to energize, $t_E$, over the entire switching period, $t_{SW}$ [1].

$$d_E = \frac{t_E}{t_{SW}} = \frac{v_D}{v_E + v_D}. \tag{1}$$

The draining duty cycle is then the complementary percentage. $\Delta i_L$ in steady state operation, where the system repeats in the same way every cycle, is:

$$\Delta i_L = \left(\frac{v_E}{L_X}\right)t_E = \left(\frac{v_D}{L_X}\right)t_D. \tag{2}$$

When a positive $V_E$ can be established even when the output is directly connected to the inductor, usually when $v_O < v_{IN}$, the system is said to be operating in buck mode. The system is operating in boost mode when $v_O > v_{IN}$. Since the inductor cannot be energized into the output when in boost, the output only receives power during the draining duty cycle $d_D$, resulting in lower accuracy at the output as the output voltage ripples when the output capacitance is drained to supply power during $d_E$. The output duty cycle $d_O$, defined as the percentage of time where the output receives power, is $d_D$ in this case.

For a system requiring a battery and an output to be supplied at the same time, a single input multiple output (SIMO) or multiple input multiple output (MIMO) solution with two inductors can be designed, where each inductor supplies one output [2, 3]. Even though such a multiple output system can provide for the battery and the load at the same time simultaneously, the downsides are increased space consumption and cost, as another bulky inductor is needed, as well as increased design overhead from needing more complex control loops. Using only one inductor is therefore desirable.

In current state of the art, single inductor DC-DC converter topologies effectively treat battery as a second output in parallel with the actual load [4-10]. The inductor energy is directed either to the load or the battery depending on the switching cycle or operating mode, but never both at the same time.

Defining output duty cycle of a simple one output converter, $d_O$, as the percentage of time the output is receiving power, $d_O$ is 1 in buck converts and $d_D$ in boost. The output duty cycle of a battery-charging voltage regulator, $d_O'$, may be defined as the percentage of time the output is receiving power instead of the battery. The output current $i_O$ then can be expressed as:

$$i_o = i_{L(AVG)} d_O d'_O, \tag{3}$$

which is highly duty-cycled.

This highly duty-cycled output results in poor dynamic accuracy, since the output needs to depend on the capacitor for power for entire, or at least heavily duty cycled, switching cycles, either creating big output voltage ripple or requiring a large output capacitance. The higher inductor current needed to be able to provide for the output in duty cycled bursts also greatly increases ohmic loss in the system.

In summary, there is a tradeoff between space/cost and accuracy/efficiency. A charging circuit according to principles described herein addresses these deficiencies of the state of the art.

BRIEF SUMMARY OF THE DISCLOSURE

Accordingly, the present invention is directed to a compact battery-charging voltage regulator that obviates one or more of the problems due to limitations and disadvantages of the related art. Described herein is a new topology, arranging switches around a single inductor and a battery, such that the battery can be put in series with the load, allowing the battery to be charged with the load current while the load is being supplied simultaneously.

In accordance with the purpose(s) of this invention, as embodied and broadly described herein, this invention, in one aspect, relates to a battery-charging voltage regulator having an inductor $L_X$; a battery $V_B$ in series with the inductor $L_X$; an output terminal VO selectively electrically connectable to the battery $V_B$; and an input terminal $V_{IN}$ selectively electrically connectable to an input of the inductor $L_X$.

In another aspect, the invention relates to an inductor $L_X$; a battery $V_B$ in series with the inductor $L_X$, wherein the inductor is between a first node $V_{SWI}$ and a second node $V_{SWX}$ and the battery is between the second node $V_{SWX}$ and a third node $V_{SWB}$; an output terminal $V_O$ selectively electrically connectable to the first node $V_{SWI}$ via a first output switch $S_{IO}$, to the second node $V_{SWX}$ via a second output switch $S_{XO}$ and to the third node $V_{SWB}$ via a third output switch $S_{BO}$; and an input terminal $V_{IN}$ selectively electrically connectable to the first node $V_{SW1}$ via an input switch $S_1$ between the first node VSW1 and the input terminal $V_{IN}$.

In a non-limiting aspect, any of the switches may be implemented in MOSFETs. For example, SXO may be a N-Type MOSFET; SIO may be a P-Type MOSFET; and SBO may be a P-Type MOSFET. $S_I$ may be a P-Type MOSFET with a first body connected to a with a first dynamic potential and the first output switch $S_{IO}$ may be a P-Type MOSFET with a second body connected to a side with a second dynamic potential.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

Further embodiments, features, and advantages of the a compact battery-charging voltage regulator, as well as the structure and operation of the various embodiments of the a compact battery-charging voltage regulator, are described in detail below with reference to the accompanying drawings.

It is to be understood that both the foregoing general description and the following detailed description are exemplary and explanatory only, and are not restrictive of the invention as claimed.

BRIEF DESCRIPTION OF THE DRAWINGS

The accompanying figures, which are incorporated herein and form part of the specification, illustrate a compact battery-charging voltage regulator. Together with the description, the figures further serve to explain the principles of the compact battery-charging voltage regulator described herein and thereby enable a person skilled in the pertinent art to make and use the compact battery-charging voltage regulator.

DETAILED DESCRIPTION

Reference will now be made in detail to embodiments of the compact battery-charging voltage regulator with reference to the accompanying figures. The same reference numbers in different drawings may identify the same or similar elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

For applications that require an output and a battery to be supplied at the same time, there are generally two types of solutions. One solution is to utilize two inductors, which can power both loads simultaneously, but require extra space for two bulky inductors. The other solution is to use one single inductor to provide for the battery and load alternately, where the battery and the output can be considered to be in parallel. This solution has higher output ripple as the load is not being supplied when the battery is being charged, and has higher losses in the system from high duty-cycled inductor current.

In a world increasingly permeated by portable electronic devices, the demand for on-the-go charging, and battery to battery charging in general, is constantly rising. Therefore DC-DC converters that can charge batteries and at the same time provide for loads is an important topic for research.

Various circuit topologies described herein provide a new efficient battery-charging voltage regulator topology that mitigates the previously mentioned shortcomings, by allowing the battery and the load to be put in series, as a flying battery. This allows uninterrupted power output to the load while charging the battery at the same time, using only one inductor. An example system is described herein with reference to 5V input, which is a common voltage output from USB ports of laptops or power banks, and a 1.8V output voltage with output power up to 0.9 W, which is sufficient power for a lot of portable electronics. Although described herein with a 5V input/1.8V output, the topologies and various circuits can be implemented in various input/output values, as appropriate. In the 5V/1.8V example, the battery can be any lithium-ion battery with a 2.7-4.2V working voltage.

Figure 1:
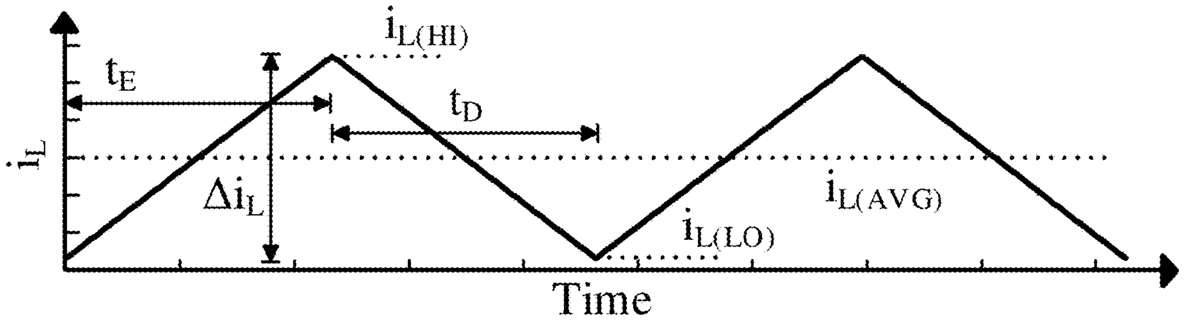
FIG. 1 shows an inductor current waveform in continuous conduction mode (CCM).
Figure 2:
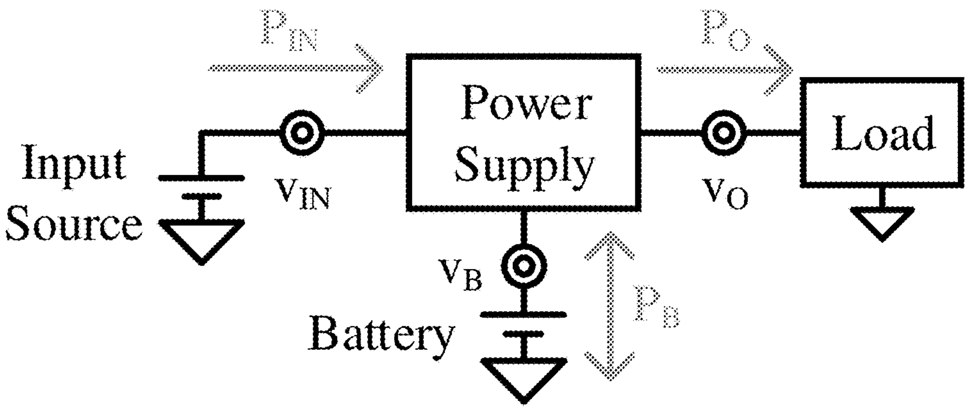
FIG. 2 illustrates a battery-charging regulator system.

The fundamental battery-charging voltage regulator system needed for battery-to-battery charging can be described with the system level schematic above in FIG. 2. FIG. 2 illustrates a battery-charging regulator system. We have a load that constantly requires power when it's on, an input that can provide power but can be absent, and a battery that can provide power but needs to be recharged. The power supply system therefore needs to be able to regulate power between all I/O ports.

When the input is present, the system should be able to provide power to the load and charge the battery at the same time until the battery is full, at which point the system will switch to powering the output exclusively. When the input is absent, the system should be able to utilize the battery to power the load. By implementing such a system, the load can be supplied with or without the input being present.

Figure 3:
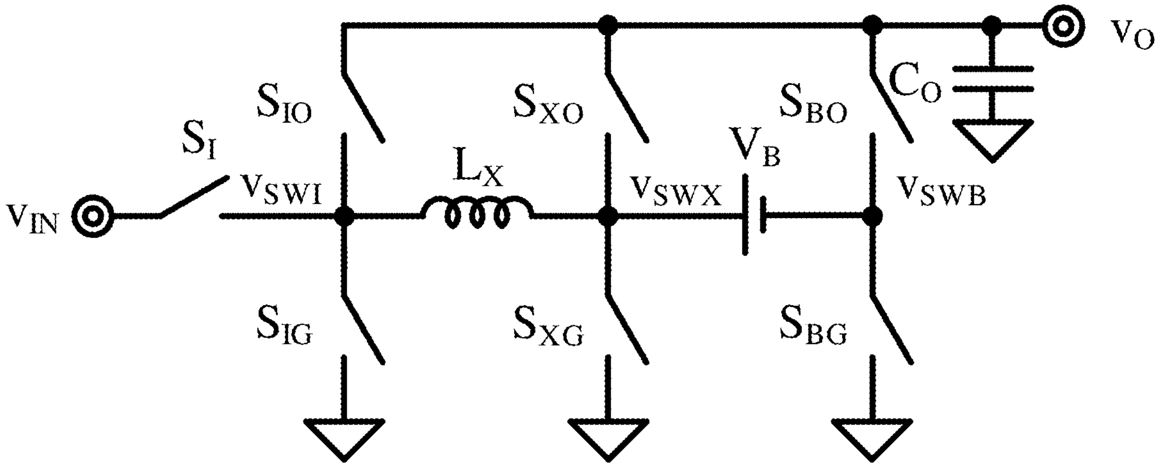
FIG. 3 is a schematic of a system according to principles described herein.

An ideal schematic for the proposed battery-charging voltage regulator is shown in FIG. 3. As illustrated, seven switches (SN) are arranged around one inductor ($L_X$) and a battery ($V_B$) to deliver power in all directions: input $v_{IN}$ to output $v_O$, battery to output, and input to both battery and output. The $v_{SWI}$ node connects to the input with a switch. The $v_{SWX}$ node is a complex node that can connect to the battery $V_B$, the output $v_O$, or the battery $V_B$ and the output $v_O$ depending on the operating mode. The $v_{SWB}$ node is the negative terminal of the battery.

In the proposed system, the battery $V_B$ and output $v_O$ can be put in series, which means they can always be powered at the same time. Furthermore, for this system, all the operating modes are designed so that the load is always supplied across an energizing duty cycle $d_E$ and draining duty cycle $d_D$, and never depends on an output capacitance $C_O$ for power, except for during load dump events. This results in high dynamic accuracy. Since the output is always connected to the inductor $L_X$, the inductor current it is the load current $i_O$, as shown in (4), instead of a much-higher-than-$i_O$ current due to the duty cycle shown in (3).

$$i_o = i_{L(AVG)} d_O d_O' = i_{L(AVG)}. \tag{4}$$

Therefore, the ohmic loss in the system, which has a square relationship with the inductor current $i_L$, is greatly reduced.

This topology also eliminates the switch usually put in front of the positive terminal of the battery to isolate it, by utilizing a floating battery. Therefore, all associated power loss such as ohmic loss, gate charging loss, etc. are reduced. The proposed topology would also have a simplified control scheme, since instead of regulating both the battery current and output voltage, the controller can now simply regulate the output voltage while the battery is automatically charged with the load current. A possible drawback of this topology is reduced output application flexibility, due to the need for the output current and battery current to match in a series configuration.

In the present example for the intended application, the system is supplied by a 5V USB input, since power banks and laptop usually provide power through USB ports [11]. The system should be able to provide up to 500 mA to a 1.8V output, which is a reasonable power draw to expect from USB[12]. The battery is selected as a lithium-ion battery, its voltage typically ranges from 2.7V to 4.2V. The resulting system has 3 operating modes. For now, only continuous conduction mode (CCM) is discussed.

Battery-Supplied Mode

Figure 4:
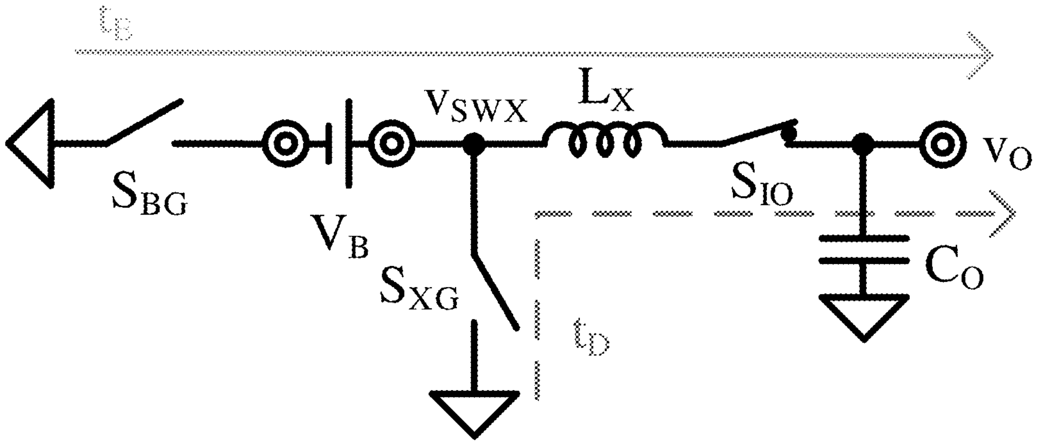
FIG. 4 is a schematic of battery-supplied mode in simplified form.

The system is in battery-supplied mode if the input is absent, and the battery supplies the output. The simplified schematic for this mode is shown in FIG. 4. FIG. 4 is a schematic of battery-supplied mode in simplified form. The power stage is configured into a buck converter, where $S_{BG}$ is the energize switch and $S_{XG}$ is the drain switch. $S_{IO}$ is always on in this mode to continuously supply power to the output from the inductor. The energizing voltage $v_E$ is therefore ($v_B$-$v_O$), and the draining voltage is $v_O$. The ideal energizing duty cycle in this mode where we deliver power from battery to output can be expressed as $$d_{EBO} = \frac{v_O}{v_B} + \frac{v_{DXG}}{v_B}\left(\frac{2t_{DT}}{t_C}\right), \tag{5}$$

where $v_{DXG}$ is the voltage dropped across $S_{XG}$'s body diode, or, if lower, the threshold voltage of $S_{XG}$. $t_{DT}$ is the dead-time defined as 5 ns for simulation purposes, and $t_C$ is the conduction time that is equal to switching period $t_{SW}$ in continuous conduction mode.

Charge-Supply Mode

Figure 5:
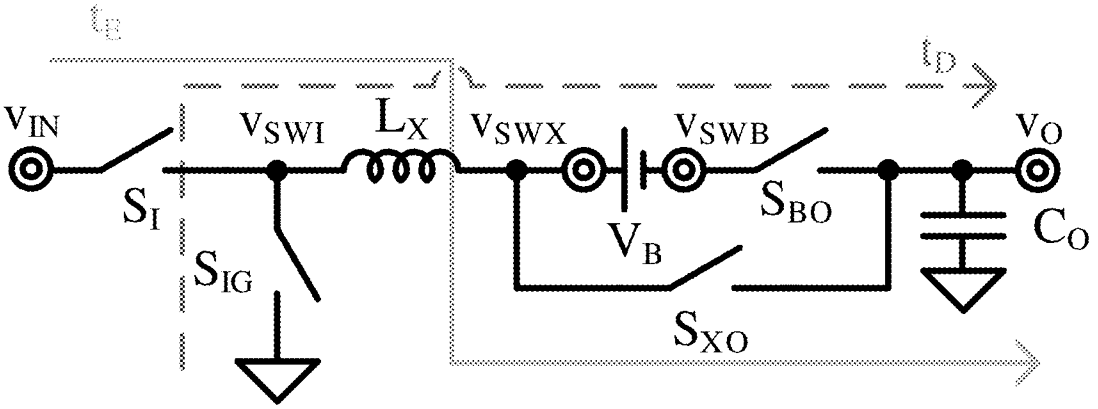
FIG. 5 illustrates a charge-supply mode operation in simplified form.

Charge-supply mode is entered when input is present and battery is not full, and it is possible to provide power to both the battery $V_B$ and the output $v_O$ simultaneously. The simplified schematic for this mode is shown in FIG. 5. Battery $V_B$ and the output $v_O$ may be put in series to provide power to both the battery $V_B$ and the output $v_O$, but the resulting series voltage on $v_{SWX}$ node ($v_O$+$V_B$) exceeds the range that the input voltage $v_{IN}$ can be reliably bucked to. Therefore, the power stage is configured as a modified buck-boost.

$S_I$ and $S_{XO}$ are on during the energizing duty cycle, and $S_{IG}$ and $S_{BO}$ are on during the draining duty cycle. The inductor is energized with ($v_{IN}$-$v_O$), where power is delivered to the output, and drained with ($v_O$+$v_B$), where power is delivered to both battery and output. The dead-time current is also carefully directed to the output. Therefore in this mode the output duty cycle $d_O$ is still 100%. The ideal energizing duty cycle in this mode where we deliver power from input to battery and output can be expressed as $$d_{EIBO} = \frac{v_B + v_O}{v_I + v_B} + \frac{v_{DIG} + v_{DBO}}{v_I + v_B}\left(\frac{2t_{DT}}{t_C}\right), \tag{6}$$

where $v_{DBO}$ is the voltage dropped across $S_{BO}$'s body diode, or, if lower, the threshold voltage. $v_{DIG}$ is the voltage dropped across SIG's body diode, or, if lower, the threshold voltage.

Figure 6:
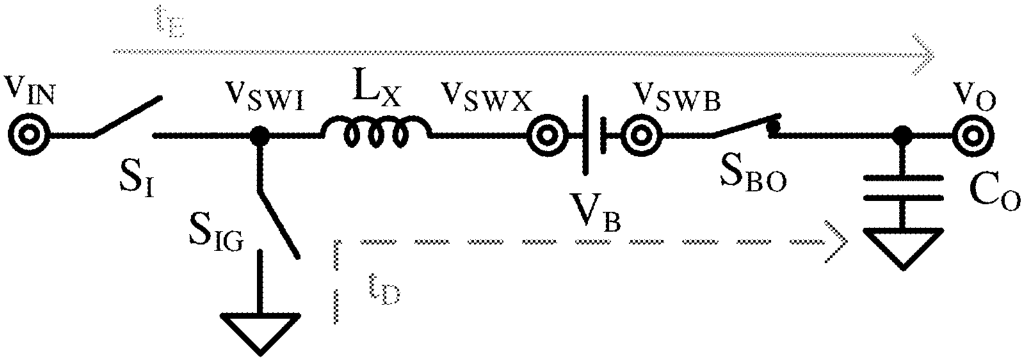
FIG. 6 illustrates an alternative charge-supply mode operation in simplified form.

An alternative version of Charge-supply mode is available in the form shown in FIG. 6 in where there is energizing and draining both into the series connection of battery and output. In this mode both output and battery receives power 100% of the time, speeding up the battery charging process. If the output is selected to be 1.8V, a positive voltage cannot be reliably established across the inductor, if the battery is kept out of deep discharge ($v_B$>3V), which should be preferred [13, 14].

Input-Supplied Mode

Figure 7:
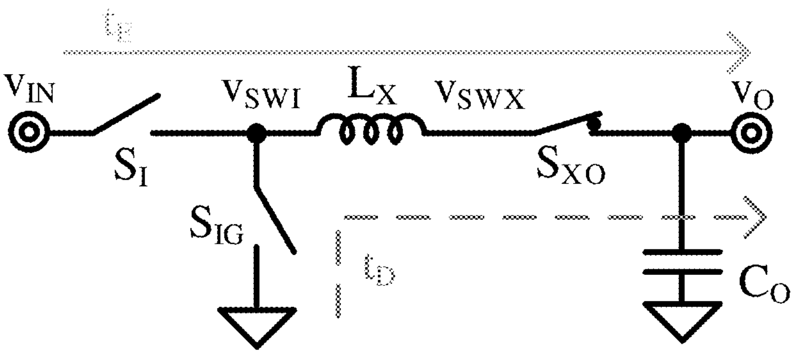
FIG. 7 is a schematic of Input-supplied mode operation in simplified form.

Input-supplied mode happens when the battery is fully charged, and the input only needs to supply the output. The simplified schematic for this mode is shown in FIG. 7.

Therefore, the power stage is reconfigured into a conventional buck converter. $S_{XO}$ is always on, and $S_I$ and $S_{IG}$ are switched with non-overlapping energizing and drain signal. The inductor is energized with ($v_{IN}$-$v_O$) and drained with $v_O$. The ideal energizing duty cycle in this mode where power delivered from input to output can be expressed as:

$$d_{EIO} = \frac{v_O}{v_I} + \frac{v_{DIG}}{v_I}\left(\frac{2t_{DT}}{t_C}\right). \quad (7)$$

Other Possible Modes

Figure 8:
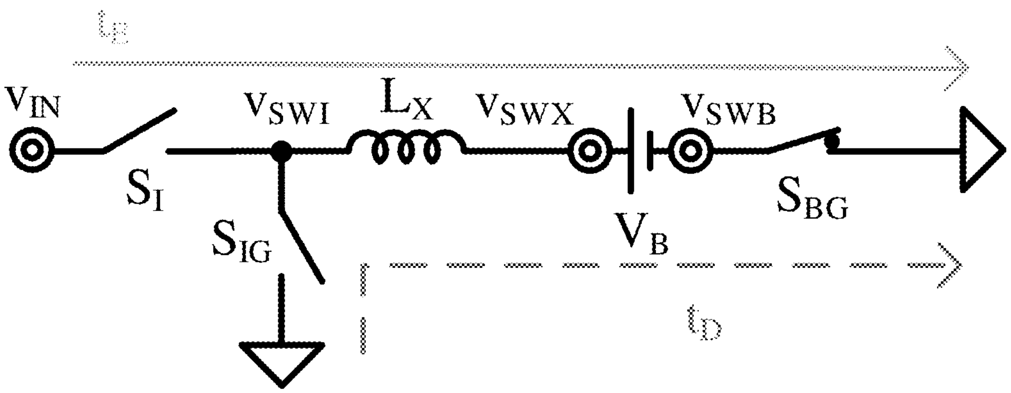
FIG. 8 illustrates one possible battery charging mode in simplified form.

The proposed topology makes many more different operating modes possible that are not selected here due to not fitting the target application. For example, if the output can be disconnected, a mode where input exclusively charges the battery can be arranged, shown in FIG. 8. FIG. 8 illustrates one possible battery charging mode in simplified form.

Figure 9:
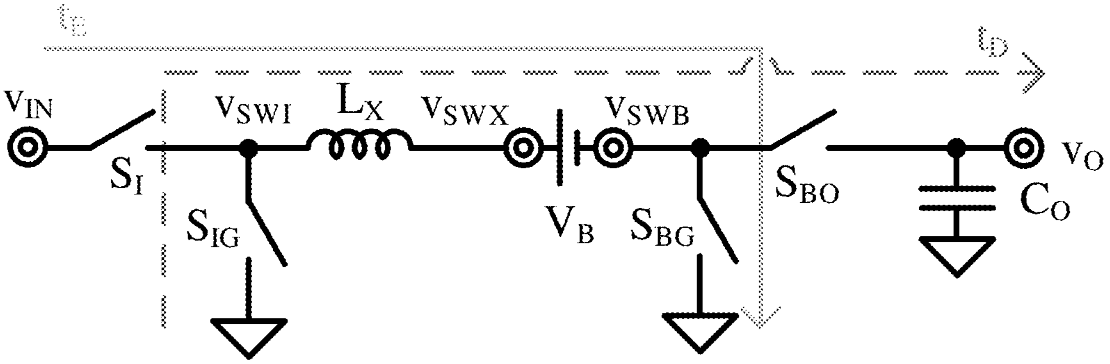
FIG. 9 shows a possible fast charge mode in simplified schematic form.

If we want the battery to be charged faster at the expense of output accuracy, when the input is powering both the load and the battery, we can operate as shown in FIG. 9. FIG. 9 shows a possible fast charge mode in simplified schematic form. In this mode the system would energize into the battery and drain into the battery and output in series. The battery would then be receiving power at all times, accelerating the charging.

This fast operation comes at the expense of maximizing output accuracy. Optimizing for this mode would also be difficult, because it in this mode is much higher than in all other modes. However, the system operating under this mode would still have higher output accuracy than the present state of the art, since the inductor still drains into the output every switching cycle.

Figure 10:
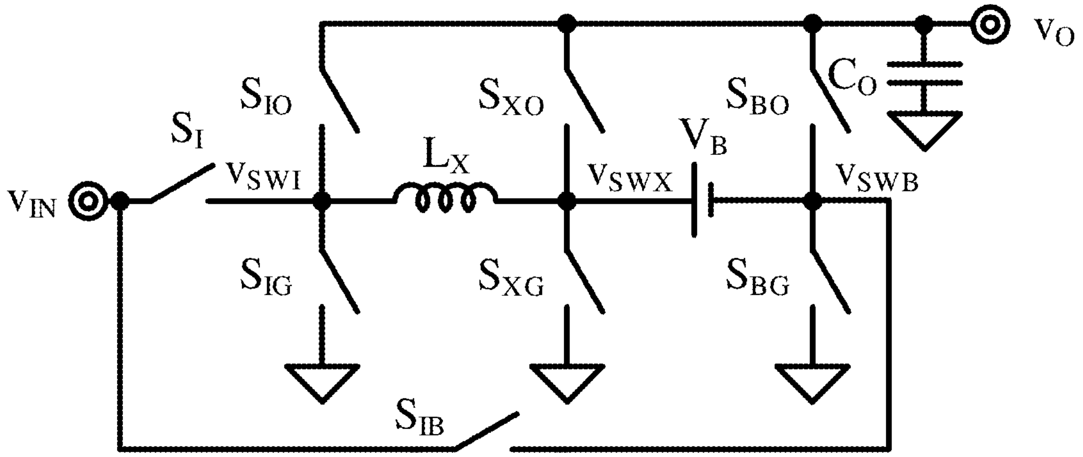
FIG. 10 is a schematic showing a modified topology to allow battery assistance.

If we want to operate in a boost mode where the output voltage is high, and we want battery assistance in providing for the output, we can modify the topology to include an additional switch $S_{IB}$ as shown in FIG. 10. FIG. 10 is a schematic showing a modified topology to allow battery assistance. With this modified topology various operating modes where we put input vIN and the battery vB in series are possible. In this case the battery is being utilized to assist the system in powering the load.

CMOS Implementation

Figure 11:
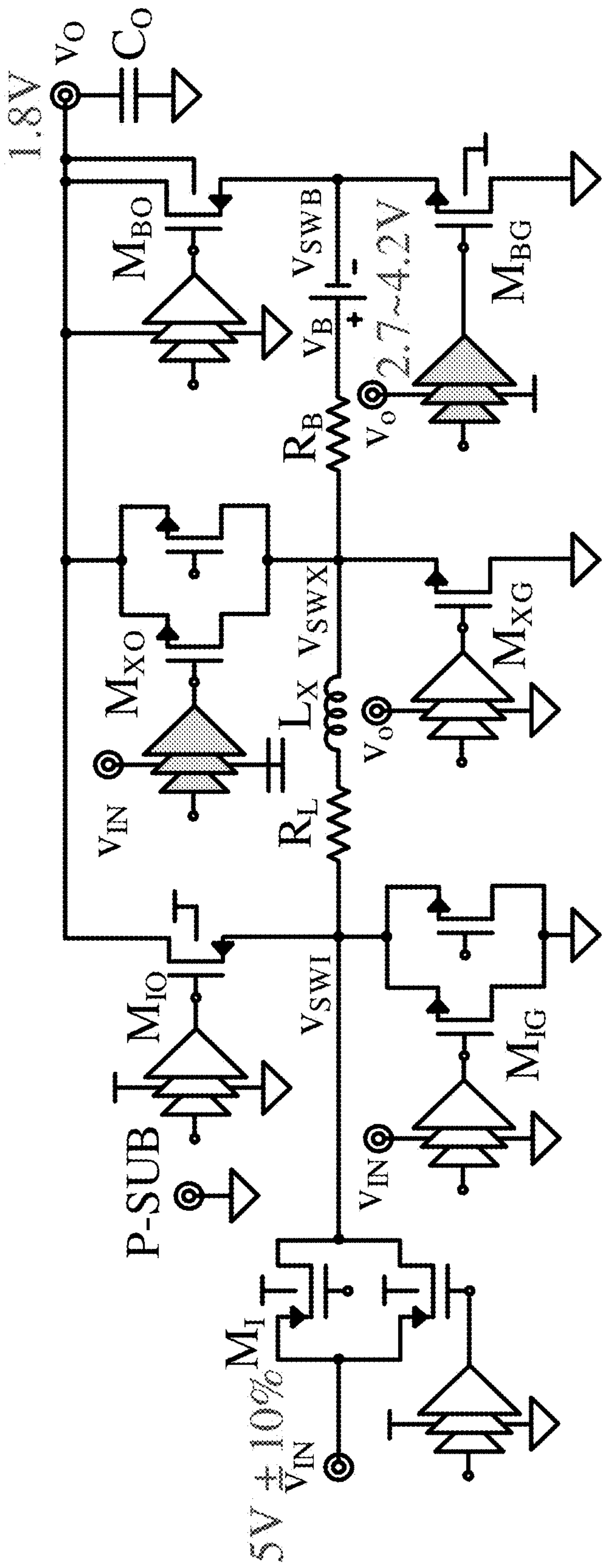
FIG. 11 shows a power stage according to principles described herein implemented in CMOS.

The proposed power stage is implemented with CMOS technology as shown in FIG. 11. FIG. 11 shows a power stage according to principles described herein implemented in CMOS. The target process is TSMC 180 HV BCD Gen2 because of its accessibility and capability to handle higher voltages imposed by the lithium-ion battery. Due to the relative high input voltage of 5V and relative low output voltage of 1.8V of the target application, N-Type devices should be preferred for all switches beside the input switch, due to their superior gate drive compounded with their higher carrier mobility.

However, due to the flexibility of this topology, complex switching node voltages may appear across operating modes, causing severe undesirable leakage or body conduction if not designed carefully. For this reason, $M_{XO}$ is designed to be N-Type while $M_{IO}$ and $M_{BO}$ are designed to be P-Type to block undesirable leakage during operation, the mechanic of which is detailed in the following sections.

Blocking Diodes

It is possible to block the conduction of switches or body diodes either due to node voltages or inductor current when it is not intended. Undesirable conductions are caused by two types of action: body diode action and implicit diode action.

Implicit Diodes: When an NMOS gate is grounded or a PMOS gate is pulled up to $v_{DD}$, if its source is pulled below ground or, for a PMOS, above $v_{DD}$ by $v_{TH}$, the MOSFET turns on. This is the implicit diode action of a regular MOSFET [15], even if it is not diode connected, and the body diodes are blocked.

During the dead-time of Charge-supply mode and Input-supplied mode, the switching input node $v_{SWI}$ is droppeds below ground to $-v_{TH}$ due to the inductor current, turning on any NMOS connected to the node even if their gates are grounded to shut it off. Since we want the dead-time current to flow to the output, we want $M_{IG}$ to undergo implicit diode action to provide inductor current during dead-time, but not $M_{IO}$. Because turning on $M_{IO}$ would take current away from the output. So $M_{IO}$ is designed to be P-type.

For similar reasons $M_{BO}$ is designed to be P-type to accommodate the reversed inductor current in the battery-supplied mode. $M_{XO}$ remains N-type since it's easy to switch its gate negative supply to a negative voltage when it is not being used, as discussed in Section [0081].

Body Diodes: To block undesirable body conduction, care should be taken when designing body connections of MOSFET switches. Referring to FIG. 11, $M_{IG}$, $M_{XG}$, and $M_{XO}$ are regular 5V devices sharing their body, which is connected to ground. These NMOS switches are on the left side/positive side of the battery, where the only voltage below ground is witnessed during dead-time, when appropriate body conduction is accepted and intended.

The P-Type $M_I$ and $M_{IO}$ should not conduct dead-time current, so their bodies can be connected to the side with highest potential to block body conduction. However, depending on the operating mode, the high voltage may appear at either side of the MOSFET.

For example, in Charge-supply mode and Input-supplied mode's energizing cycles, $v_{SWI}$ is the higher potential at 5V of $v_{IN}$, but during draining $v_O$ is the higher potential at 1.8V compared to $v_{SWI}$'s 0V. Connecting the bodies of $M_I$ and $M_{IO}$ to $v_{IN}$ is not possible either since input can be absent. Therefore $M_I$ and $M_{IO}$'s bodies need to be connected to a special block, a $v_{MAX}$ selector block, that dynamically selects the highest voltage in the system. The block is detailed in Section [0081].

Still referring to FIG. 11, on the right side of the battery on the $v_{SWB}$ node, we can observe negative voltages up to $-v_B$ when $v_{SWX}$ is grounded, which can be even more severe during dead-time. This is caused by the floating battery topology where there's no switch in front of the battery to isolate it from the rest of the system. The P-Type $M_{BO}$'s body can be connected up to the output node, but $M_{BG}$'s body poses a problem, since connecting it to the shared body at ground cannot block body conduction when $v_{SWB}$'s voltage drops to $-v_B$. Therefore, we need to connect $M_{BG}$'s body, alongside its gate driver's negative supply, to a minimum voltage selector node $v_{MIN}$, which dynamically selects the lowest voltage in the system. This way undesirable body and channel connection is therefore prevented.

There are reasons for not connecting the shared the body to the $v_{MIN}$ block. First, it creates severe body effect for all NMOS in the system, creating high power loss. Second, the shared body would have a high capacitance, which would be continually charged and discharged by the dynamic $v_{MIN}$ voltage, also creating high power loss. Therefore, isolating the its body can be helpful, which can be done in modern processes including TSMC's BCD Gen 2, by surrounding it with an epitaxially grown N type wall.

$S_{BO}$ can be a NMOS too if we isolate its body and connect it to $v_{MIN}$. But the increased gate swing from $v_{IN}$ to ($v_{IN}$+

$|v_{MIN}|$) increases gate charge loss, resulting in a higher overall loss compared to PMOS, and consequentially $S_{BO}$ as NMOS loses its advantage over PMOS. So, a PMOS is still selected for $S_{BO}$.

Dead-Time Conduction

Since we want the dead-time current to go towards the output to not waste power, the body diode of P-Type $S_{BO}$ must be connected to the output, so that when the inductor current flows from left to right, the dead-time current will flow through $S_{BO}$'s body diode to the output. For when the inductor current flow from right to left during Battery-supplied mode, no special body connection is needed as $S_{IO}$ is constantly on during the operating mode when that happens, so the dead-time current will flow through its channel just like normal operating currents.

Minimum/Maximum Voltages

Figure 12:
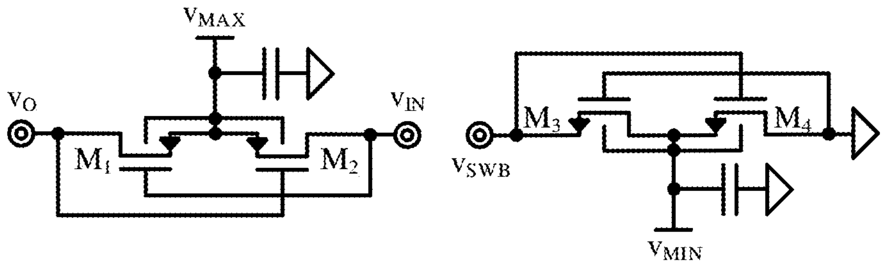
FIG. 12 shows $V_{MAX}$ and $V_{MIN}$ selector blocks according to principles described herein.

The maximum and minimum voltage selectors are shown above in FIG. 12. The maximum voltage selector selects between the two high voltages in the system: $v_O$ and $v_{IN}$. The minimum voltage selector selects between the two lowest potentials in the system: $v_{SWB}$ and ground. The selector node voltage $v_{MAX}$ and $v_{MIN}$ can dynamically track the more extreme voltage, whether it's a stable or a switching voltage. The use for these blocks are discussed in previous sections. Note that vMAX is not actually selecting the two highest voltages in the system, which would be $v_{IN}$ and $v_{SWX}$, the reason being that $v_{SWX}$ is only connected to N-Type devices, so high voltages at $v_{SWX}$ would not cause undesirable conduction.

When the voltages being selected from are close to each other within one VTH, which can happen for the $v_{MIN}$ block, neither MOSFET in the selector has a solid gate drive, which can result in the selector not functioning as intended. This requires the system to be designed to not rely on selector voltages during such transients. Or the system could be designed to function normally, even when $v_{MIN}$ selector voltage is stuck a $v_{TH}$ from the other node that is being selected. For example $v_{MIN}$ cannot react to $v_{SWI}$ dropping to $-v_{TH}$ even if we design a $v_{MIN}$ block connected to it, so a N-Type $M_{IO}$'s undesirable implicit diode conduction during dead-time cannot be prevented without a static negative rail. For this reason $M_{IO}$ is selected as P-Type instead.

A negative rail can also effectively block undesirable implicit and body diode conduction. But a dynamic $v_{MIN}$ selector is preferred, both for the improved performance from not having body effect when $M_{BG}$ is on, and for the lowered silicon area requirement from not needing a big capacitor, which would be required for charging the gates of the big power switches.

Figure 13:
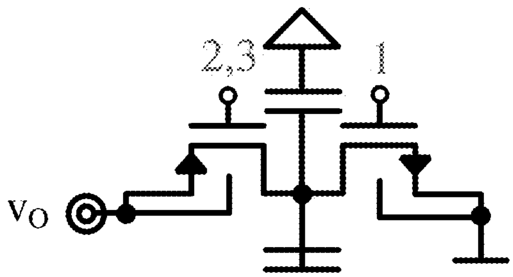
FIG. 13 is a schematic of a negative gate-driver supply MXO.

The negative supply of the gate drivers of $M_{XO}$ can be switched between $v_O$ and $v_{MIN}$ with the switches shown in FIG. 13. FIG. 13 is a schematic of a negative gate-driver supply $M_{XO}$. During Charge-supply mode and Input-supplied mode, the voltage at the source of $M_{XO}$ never drops below $v_O$, therefore driving the gate driver's negative supply with $v_O$ instead of GND is sufficient and saves gate charging energy. During battery-supplied mode where we need a negative voltage to prevent dead-time conduction of $M_{XO}$'s implicit diode action, we can connect it to $v_{MIN}$, which would select $v_{SWB}$ when $v_{SWB}$ is being dropped to a very low negative voltage by the dead-time current.

Sizing and Switching Frequency Design

This section discusses the process of designing the system parameters: switch sizes, switching frequency, and inductor size.

Switch sizing: When sizing the MOSFET switches in the system, we need to balance the two losses that it contributes to, There's ohmic loss PRM that scales inversely with transistor width[16]:

$$P_{RM} = \left[i_O^2 + \left(\frac{0.5\Delta i_L}{\sqrt{3}}\right)^2\right]\frac{L}{W}\frac{d_{E/D}}{K_{N/P}(v_{GS/SG} - |v_{TH}|)}, \quad (8)$$

where $K_{N/P}$ is the transconductance parameter L is the length of the transistor, and W is the width of the transistor. There's also gate charge loss PGC that scales linearly with transistor width:

$$P_{GC} = f_{SW} V_G C_G, \quad (9)$$

where $f_{SW}$ is the switching frequency, VG is the voltage swing of the gate drive, $C_G$ is the gate capacitance, which scales linearly with transistor width.

We can arrive at the optimal width where we have the least loss by taking a derivative of $P_{RM}+P_{GC}$ with respect to width.

Inductor sizing and switching frequency: Similar to MOSFET switch sizing, there's an optimal size for the inductor, determined by the inductor ohmic loss $P_{RL}$ which scales linearly with inductor size with an extra AC component from skin effect [17-19], and core loss which scales inversely with inductor size [20, 21].

As shown in (8) and (9), optimal MOSFET sizing depends on both the inductor sizing, which determines $\Delta i_L$, and $f_{SW}$ selection, and inductor sizing depends on switching frequency selection. Therefore we need to optimize these components together and find the stationary point of the $P_{Loss}$ function with respect to its two variables, $L_X$ and $f_{SW}$. Every loss and their dependency on $L_X$ and $f_{SW}$ is shown in TABLE I. below:

TABLE I

ALL LOSSES IN SYSTEM AND THEIR DEPENDENCY

| Loss | Dependency |
|---|---|
| $P_{DT}$ | $f_{SW}L_X^0$ |
| $P_{GC}$ | $f_{SW}L_X^0$ |
| $P_{RM(DC)}$ | $f_{SW}^0L_X^0$ |
| $P_{RL(DC)}$ | $f_{SW}^0L_X$ |
| $P_{RM(AC)}$ | $f_{SW}^{-2}L_X^{-2}$ |
| $P_{RL(AC)}$ | $f_{SW}^{-2}L_X^{-1}$ |
| $P_{Core}$ | $f_{SW}^{-1}L_X^{-1}$ |
| $P_{IV}$ | $f_{SW}^{-1}L_X^{-1}$ |
| $P_{RB}$ | $f_{SW}^0L_X^0$ |

Figure 14:
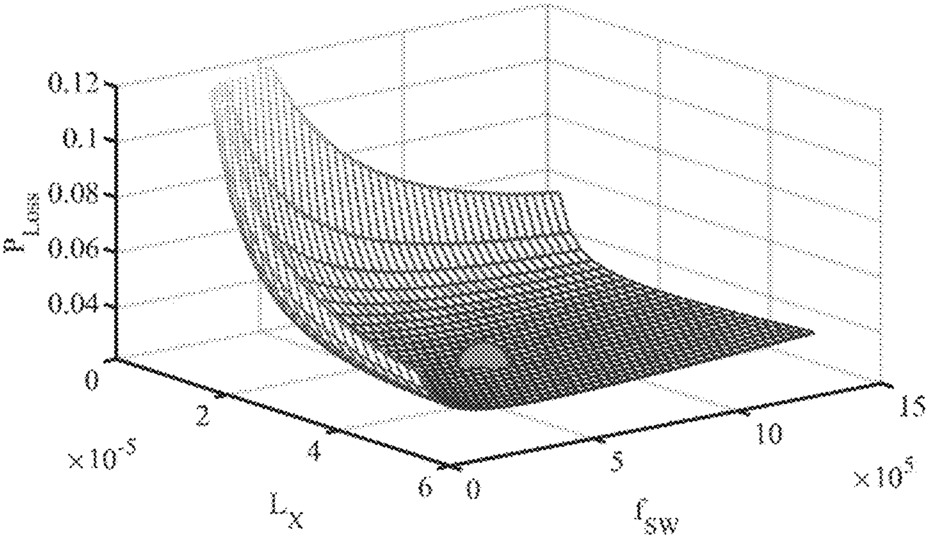
FIG. 14 illustrates optimization of PLoss.

$P_{DT}$ denotes dead-time loss, DC/AC subscripts denote the DC/AC components of a particular loss, $P_{RM}$ denotes MOSFET ohmic loss, $P_{RL}$ denotes inductor equivalent series resistance (ESR) loss, $P_{RB}$ denotes battery ESR loss, and $P_{Core}$ denotes inductor core loss. The total $P_{Loss}$ is the sum of these losses. The minimum $P_{Loss}$ point can be visualized in FIG. 14.

Such a plot can be generated for each operating mode. The average optimal $L_X$ is found, and system is re-optimized with the average $L_X$ to find the optimal $f_{SW}$ for each operating mode. Each operating mode is then simulated under its own optimal switching frequency.

The proposed CMOS power stage is simulated in LTspice to verify its operation. MOSFET models with value extracted from TSMC documentation and simulation are used to construct the models used in LTspice. The controller is not yet implemented, so the gate driver stacks are driven by ideal voltage sources with manually inputted on times. The switching frequencies are set to the optimal value for each mode, and a current source at the output is used to sink a current of 250 mA, which is half the entire operating range. The simulated min/max selector output $v_{MIN}$ and $v_{MAX}$, inductor current $i_L$, and output voltage $v_O$ are plotted to show system operation. Duty cycle is calculated using (5)-(7) with the optimal $f_{SW}$ derived in section [0086], with a dead-time of 5 ns.

Battery-Supplied Mode

Figure 15:
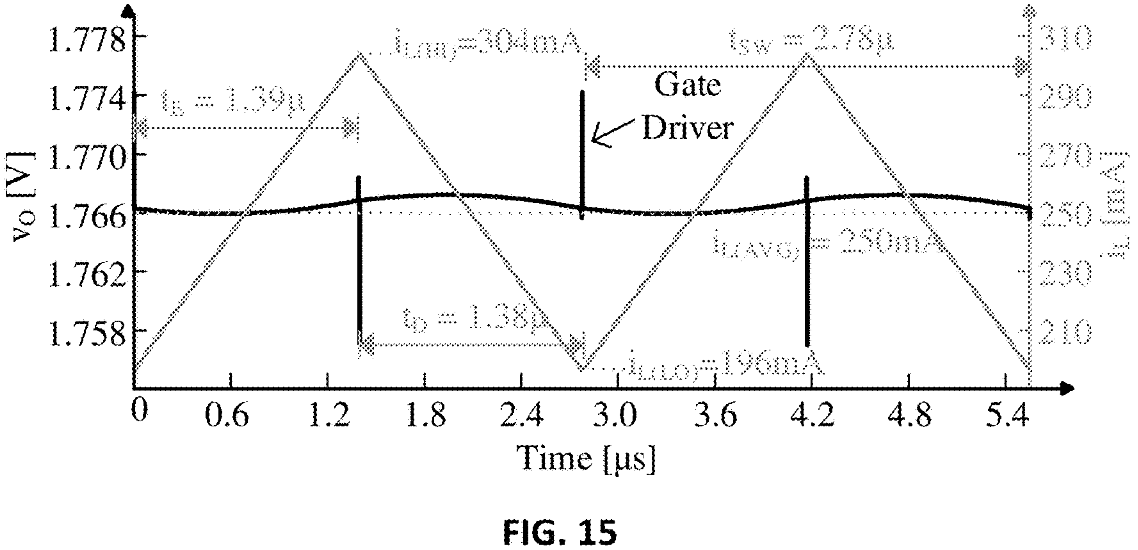
FIG. 15 shows battery-supplied mode simulations of iL and vO.

The simulation plots of this mode are shown below in FIG. 15. FIG. 15 shows battery-supplied mode simulations of $i_L$ and $v_O$. The spikes on the $v_O$ plot are the result of gate drivers taking energy from $v_O$ for the switches driven directly by it.

Figure 16:
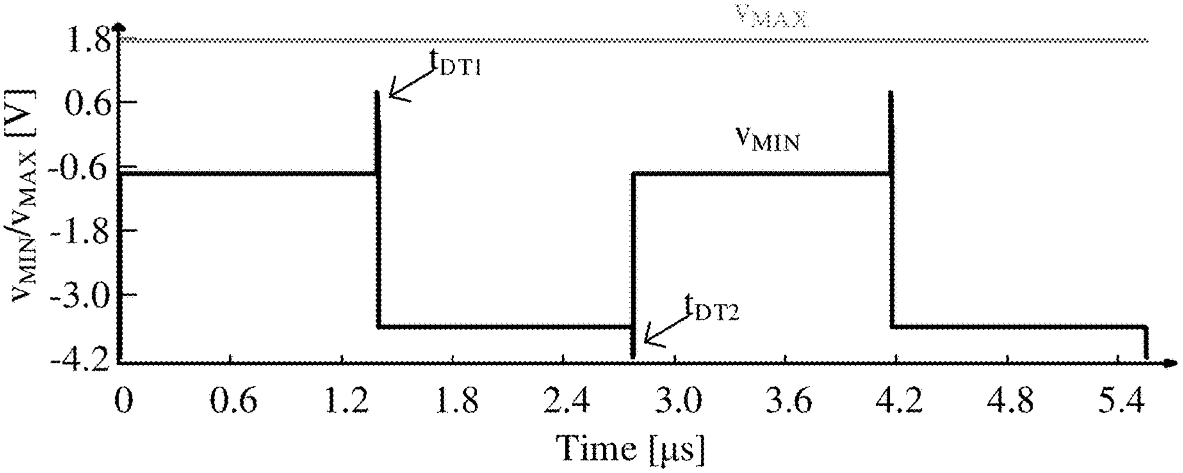
FIG. 16 shows battery supplied mode simulation of vmin and vmax.

The $v_{MIN}$ and $v_{MAX}$ voltages are shown in FIG. 16. Error! Reference source not found. FIG. 16 shows battery supplied mode simulation of $v_{MIN}$ and $v_{MAX}$. The $v_{MAX}$ voltage is a steady vO, because it's not being used by any switching MOSFETs. $v_{MIN}$ switches between −vB and −vTH during energizing and draining time, as expected. The $v_{MIN}$ voltage spikes twice during the two dead-time in this mode.

During the dead-time after the energizing period, $t_{DT1}$, both switches in the $v_{MIN}$ selector are off, because the difference between $v_{SWB}$ and GND is smaller than VTH. The $v_{MIN}$ voltage spikes up since $M_{BG}$ is turning off, charging the $v_{MIN}$ node. $M_{BG}$ therefore conducts dead-time current instead of $M_{XG}$. During the dead-time after the draining period, $t_{DT2}$, $v_{SWB}$'s voltage is dragged down by the inductor current, and $v_{MIN}$'s voltage follows, creating a spike.

The power loss in this mode is 19.52 milli watts, with 17.1% being PRM, 23.8% being PRL, 24.1% being PRB, 14.1% being PGC, 4.1% being PDT, 16.1% being $P_{Core}$, and 0.7% of other losses including PIV, PR(AC) etc. The conversion efficiency of this mode is 95.84%, and fractional loss is 4.16%.

Charge-Supply Mode

Figure 17:
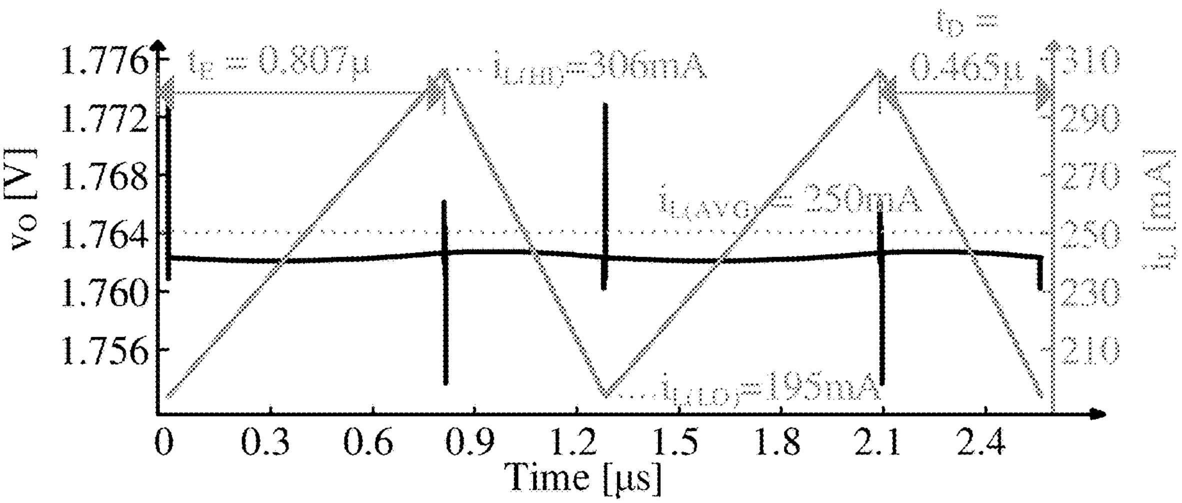
FIG. 17 shows charge-supply mode simulation of IL and VO.
Figure 18:
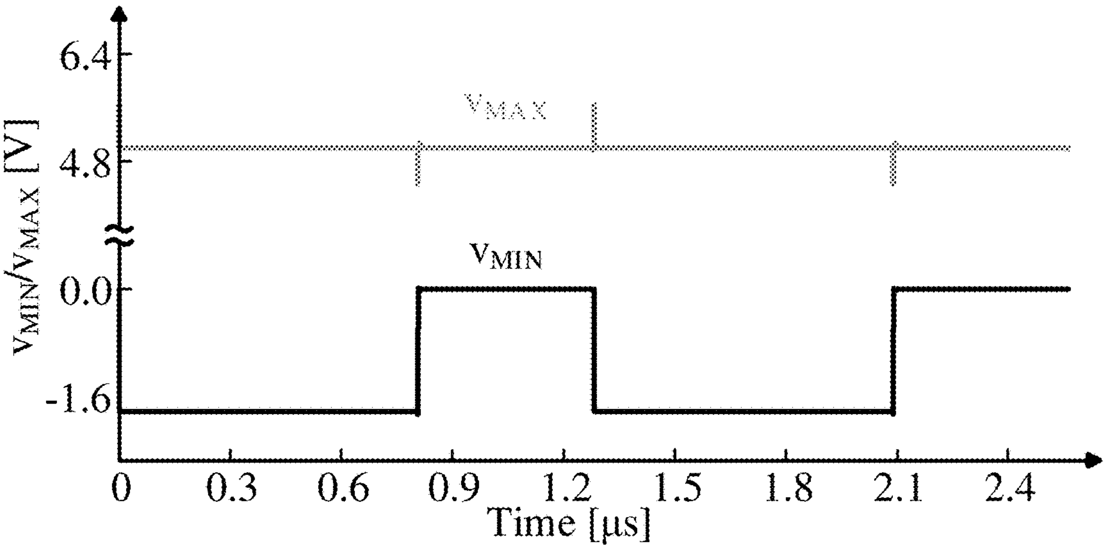
FIG. 18 shows Charge-supply mode simulation vMIN and vMAX.

The simulation plots of this mode are shown below in FIG. 17 and FIG. 18. FIG. 17 shows charge-supply mode simulation of $I_L$ and $V_O$, and FIG. 18 shows Charge-supply mode simulation $v_{MIN}$ and $v_{MAX}$. The $v_{MAX}$ is a steady voltage set by $v_{IN}$, with spikes created by gate drivers' operations. $v_{MIN}$ switches between ($v_O$-$v_B$) and GND during energizing and draining time, as expected.

The power loss in this mode is 27.29 milli watts, with 15.3% being PRM, 17% being PRL, 12.9% being PRB, 15.3% being PGC. 12.6% being PDT, 26.5% being $P_{Core}$, and 0.4% of other losses including PIV, PR(AC) etc. The conversion efficiency of this mode is 96.63%, and fractional loss is 3.37%.

Input-Supplied Mode

Figure 19:
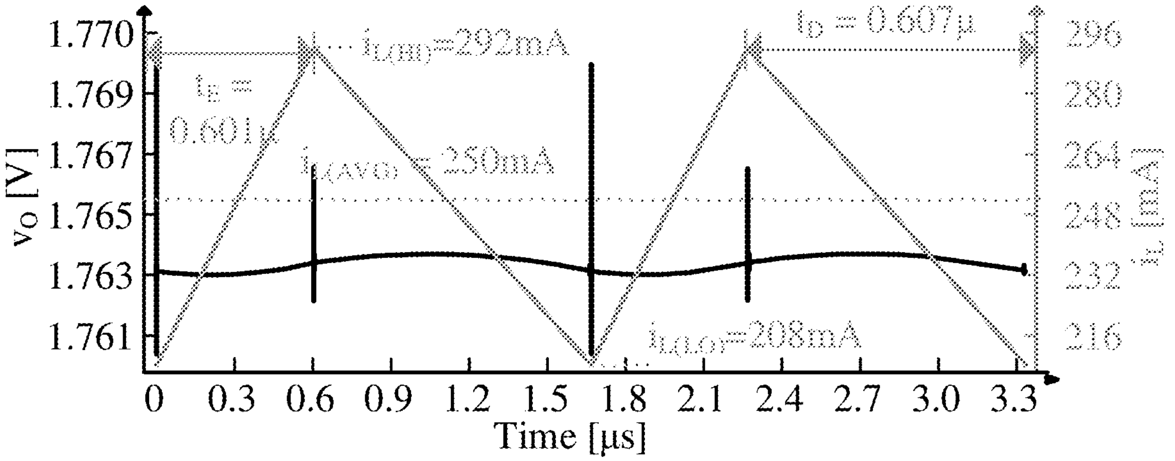
FIG. 19 shows Input-supplied mode simulation $i_L$ and $v_O$.

The simulation plot of this mode is shown in FIG. 19. FIG. 19 shows Input-supplied mode simulation $i_L$ and $v_O$. $v_{MAX}$ and $v_{MIN}$ are not shown since they are both steady voltages at $v_{IN}$ and ($v_O$-$v_B$) respectively in this mode.

The power loss in this mode is 13.89 milli watts, with 20.4% being PRM, 33.4% being PRL, 0% being PRB, 14.1% being PGC, 9.5% being PDT, 22.3% being $P_{Core}$, and 0.3% of other losses including PIV, PR(AC) etc. The conversion efficiency of this mode is 98.01%, and fractional loss is 2.99%.

From the simulations, we can see that the systems achieves a conversion efficiency of 95.84%~98.01%, and a static ripple of less than 0.6 milli volts, which is 0.03% of the output voltage, with an output capacitor of 30 micro Farads, and only one inductor of 23 micro Henries. The low ripple, low power loss combined with the low space consumption of this topology eliminates the tradeoff between them for traditional topologies, as long as the output's current matches the charging profile of the battery.

This system described herein would be useful in applications where a power supply can charge a battery and supply a load at the same time. It is especially advantageous in applications where high efficiency and output accuracy is desired, and strict space constraint is present. Most modern portable electronics all have preferences for such a system. Even though this demo system presented in this report is for 5V input and 1.8V output applications, the fundamental topology shown in FIG. 3 is flexible and can be applied to a wide variety of situations.

This work proposes a new efficient battery-charging voltage regulator topology that mitigates the space/cost vs. accuracy/efficiency tradeoff in the state of the art. The topology arranges switches around the battery and the inductor, creating a configurable switched-inductor power supply. This power stage is able to regulate power between an input, a battery, and an output to power the output continuously with or without the input present. The battery can be charged at the same time as the load is powered, by putting them in series as a flying battery. This allows uninterrupted power output to the load while charging the battery simultaneously, with only one inductor. The main target application is on-the-go battery charging with other batteries, and portable electronics in general. Examples include laptop to phone/tablet charging, power bank to phone/tablet charging, smart watch charging, etc.

In an example embodiment, a battery-charging voltage regulator includes an inductor $L_X$; a battery $V_B$ in series with the inductor $L_X$; an output terminal $V_O$ selectively electrically connectable to the battery $V_B$; and an input terminal $v_{IN}$ selectively electrically connectable to an input of the inductor $L_X$.

The battery-charging voltage regulator, for example, may be configured with an inductor $L_X$; a battery $V_B$ in series with the inductor $L_X$, wherein the inductor is between a first node $V_{SWI}$ and a second node $V_{SWX}$ and the battery is between the second node $V_{SWX}$ and a third node $V_{SWB}$; an output terminal $V_O$ selectively electrically connectable to the first node $V_{SWI}$ via a first output switch $S_{IO}$, to the second node $v_{SWX}$ via a second output switch $S_{XO}$ and to the third node $v_{SWB}$ via a third output switch $S_{BO}$; and an input terminal $V_{IN}$ selectively electrically connectable to the first node $v_{SWI}$ via an input switch $S_1$ between the first node $V_{SW1}$ and the input terminal $V_{IN}$.

In the battery-charging voltage regulator, the first node $V_{SWI}$ may be electrically connectable to ground via a first ground switch $S_{IG}$, the second node $V_{SWX}$ may be electrically connectable to ground via a ground switch $S_{XG}$ and the third node $V_{SWB}$ may be connectable to ground via a third ground switch $S_{BG}$.

In the battery-charging voltage regulator, the inductor $L_X$ and the battery $V_B$ may be configurable in a battery supply mode, a charge supply mode, and an input-supplied mode.

In the battery-charging voltage regulator, in the battery supply mode, the input switch output switch $S_{IO}$ is closed and the first ground switch $S_{IG}$, the second output switch $S_{XO}$, and the third output switch $S_{BO}$ are open.

The charge supply mode includes an energizing duty cycle and a draining duty cycle.

In the energizing duty cycle, the input switch SI and the second output switch SXO may be closed such that the inductor is energized with VIN-VO such that power is delivered to the output.

In the draining duty cycle, the first ground switch SIG and the third output switch SBO may be on such that power is delivered to both the battery VB and the output VO.

In an alternative charge supply mode, the input switch SI and the first ground switch SIG are open and the third output switch SBO is closed such that both the output terminal and the battery receive power from the inductor. In the input-supplied mode, second output switch SXO is on, and first ground switch SIG and the input switch SI are switched with non-overlapping energizing and drain signals, such that the output terminal receives power from the inductor such that the inductor is energized with VIN-VO and drained with VO.

In an aspect, the inductor and the battery may be configurable in a battery charging mode wherein the input switch SI and the first ground switch SIG are switched with non-overlapping energizing and drain signals and the third ground switch SBG is closed, such that the battery always receives power, and output does not receive power.

The inductor and the battery may be configurable in a battery charging mode wherein the input switch SI, the third ground switch SBG are closed in the energizing duty cycle, and the first ground switch SIG, third output switch SBO are closed in the draining duty cycle, such that the battery always receives power, and the output receives power during draining.

The battery charging voltage regulator may include a battery switch SIB between the third node VSWB and the input terminal VIN.

The battery charging voltage regulator may include an output capacitance connected between the output terminal and ground.

In the battery charging voltage regulator, the first output switch SIO, the second output switch SXO, the third output switch SBO, the first ground switch SIG, the second ground switch SXG, third ground switch SBG, and the input switch SI may each comprise metal-oxide semiconductors.

For example, the second output switch SXO may be a N-Type MOSFET; the first output switch SIO may be a P-Type MOSFET; and the third output switch SBO may be a P-Type MOSFET.

In battery supply mode, in a device in which the second ground switch SXG is an N-Type MOSFET, the third ground switch SBG is an N-Type MOSFET, the second ground switch SXG and the third ground switch SBG may be switched with non-overlapping energizing and drain signals, such that the battery supplies output to the output terminal VO.

In an aspect of the battery charging voltage regulator, the input switch SI may be a P-Type MOSFET with a first body connected to a with a first dynamic potential and the first output switch SIO may be a P-Type MOSFET with a second body connected to a side with a second dynamic potential. The first dynamic potential may be the second dynamic potential.

The first ground switch SIG, the second ground switch SXG, and the second output switch SXO may be MOSFET switches sharing a body, which is connected to ground.

The third output switch $S_{BO}$ may be a P-Type body connected to the output terminal VO.

The battery charging voltage regulator may include a minimum voltage selector circuit between the third node VSWB and ground.

The battery charging voltage regulator may include a maximum voltage selector circuit between input terminal VIN and output terminal VO.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

Throughout this application, various publications may have been referenced. The disclosures of these publications in their entireties are hereby incorporated by reference into this application in order to more fully describe the state of the art to which this invention pertains.

[1] G. A. Rincón-Mora, "Switched Inductors," in Switched Inductor Power IC Design: Springer International Publishing, 2023, pp. 103-166.

[2] E. Babaei and O. Abbasi, "A new topology for bidirectional multi-input multi-output buck direct current-direct current converter," International Transactions on Electrical Energy Systems, vol. 27, no. 2, p. e2254, 2017-02-01 2017, doi: 10.1002/etep.2254.

[3] M. Dhananjaya, D. Ponuru, T. S. Babu, B. Aljafari, and H. H. Alhelou, "A New Multi-Output DC-DC Converter for Electric Vehicle Application," IEEE Access, vol. 10, pp. 19072-19082, 2022-01-01 2022, doi: 10.1109/access.2022.3151128.

[4] J.-Y. Kim, B.-S. Lee, S.-H. Lee, J.-H. Ahn, and J.-K. Kim, "Integrated Single Inductor Converter for a DC Grid System Connected With Battery and Load," IEEE Transactions on Industrial Electronics, vol. 68, no. 12, pp. 12010-12020, 2021/12//2021, doi: 10.1109/TIE.2020.3047062.

[5] H. Shao, X. Li. C.-Y. Tsui, and W.-H. Ki, "A Novel Single-Inductor Dual-Input Dual-Output DC-DC Converter With PWM Control for Solar Energy Harvesting System," IEEE Transactions on Very Large Scale Integration (VLSI) Systems, vol. 22, no. 8, pp. 1693-1704, 2014/08//2014, doi: 10.1109/TVLSI.2013.2278785.

[6] Y.-H. Lam, W.-H. Ki, C.-F. Tsui, and P. K. T. Mok, "Single-inductor dual-input dual-output switching converter for integrated battery charging and power regulation," in 2003 IEEE International Symposium on Circuits and Systems (ISCAS), 2003/05//2003, vol. 3, pp. III-III, doi: 10.1109/ISCAS.2003.1205052. [Online]. Available: files/239/1205052.html

[7] J.-H. Jung. Y.-H. Jung, S.-K. Hong, and O.-K. Kwon, "A High Peak Output Power and High Power Conversion Efficiency SIMIMO Converter Using Optimal on-Time Control and Hybrid Zero Current Switching for Energy Harvesting Systems in IoT Applications," IEEE Transactions on Power Electronics, vol. 35, no. 8, pp. 8261-8275. 2020/08//2020, doi: 10.1109/TPEL.2019.2963513.

[8] P.-C. Huang and T.-H. Kuo, "A Reconfigurable and Extendable Single-Inductor Single-Path Three-Switch Converter for Indoor Photovoltaic Energy Harvesting," IEEE Journal of Solid-State Circuits, vol. 55, no. 7, pp. 1998-2008, 2020/07//2020, doi: 10.1109/JSSC.2020.2987722.

[9] D. El-Damak and A. P. Chandrakasan, "A 10 nW-1 µW Power Management IC With Integrated Battery Management and Self-Startup for Energy Harvesting Applications," IEEE Journal of Solid-State Circuits, vol. 51, no. 4, pp. 943-954, 2016/04//2016, doi: 10.1109/JSSC.2015.2503350.

[10] I. C. Chen, C.-W. Liang, and T.-H. Tsai, "A Single-Inductor Dual-Input Dual-Output DC-DC Converter for Photovoltaic and Piezoelectric Energy Harvesting Systems," IEEE Transactions on Circuits and Systems II: Express Briefs, vol. 66, no. 10, pp. 1763-1767, 2019/10//2019, doi: 10.1109/TCSII.2019.2921349.

[11] A. Manthiram, "An Outlook on Lithium Ion Battery Technology," ACS Central Science, vol. 3, no. 10, pp. 1063-1069, 2017-10-25 2017, doi: 10.1021/acscentsci.7b00288.

[12] F. He, "USB Port and power delivery: An overview of USB port interoperabiliy," in 2015 IEEE Symposium on Product Compliance Engineering (ISPCE), 2015-05-01 2015: IEEE, doi: 10.1109/ispce.2015.7138710.

[13] J. Xiong et al., "Failure detection for over-discharged Li-ion batteries," in 2012 IEEE International Electric Vehicle Conference, 2012-03-01 2012: IEEE, doi: 10.1109/ievc.2012.6183238.

[14] R. Guo, L. Lu, M. Ouyang, and X. Feng, "Mechanism of the entire overdischarge process and overdischarge-induced internal short circuit in lithium-ion batteries," Scientific Reports, vol. 6, no. 1, p. 30248, 2016-09-01 2016, doi: 10.1038/srep30248.

[15] G. A. Rincón-Mora, "Field-Effect Transistors," in Switched Inductor Power IC Design: Springer International Publishing, 2023, pp. 45-102.

[16] G. A. Rincón-Mora, "Power Losses," in Switched Inductor Power IC Design: Springer International Publishing, 2023, pp. 167-240.

[17] H. A. Wheeler, "Formulas for the Skin Effect," Proceedings of the IRE, vol. 30, no. 9, pp. 412-424, 1942-09-01 1942, doi: 10.1109/jrproc.1942.232015.

[18] J. D. Cockcroft, "Skin effect in rectangular conductors at high frequencies," Proceedings of the Royal Society of London. Series A, Containing Papers of a Mathematical and Physical Character, vol. 122, no. 790, pp. 533-542, 1929-02-01 1929, doi: 10.1098/rspa.1929.0038.

[19] G. Antonini, A. Orlandi, and C. R. Paul, "Internal impedance of conductors of rectangular cross section," IEEE Transactions on Microwave Theory and Techniques, vol. 47, no. 7, pp. 979-985, 1999-07-01 1999, doi: 10.1109/22.775429.

[20] K. Venkatachalam, C. R. Sullivan, T. Abdallah, and H. Tacca, "Accurate prediction of ferrite core loss with nonsinusoidal waveforms using only Steinmetz parameters," in 2002 IEEE Workshop on Computers in Power Electronics, 2002. Proceedings: IEEE, doi: 10.1109/cipe.2002.1196712.

[21] K. Gorecki and K. Detka, "Analysis of influence of losses in the core of the inductor on parameters of the buck converter," in 2018 Baltic URSI Symposium (URSI), 2018-05-01 2018: IEEE, doi: 10.23919/ursi.2018.8406725.

What is claimed is:

1. A battery-charging voltage regulator, comprising an inductor $L_X$;

a battery $V_B$ in series with the inductor $L_X$, wherein the inductor is between a first node $V_{SWI}$ and a second node $V_{SWX}$ and the battery is between the second node $V_{SWX}$ and a third node $V_{SWB}$;

an output terminal $V_O$ selectively electrically connectable to the second node $V_{SWX}$ via a second output switch $S_{XO}$ and to the third node $V_{SWB}$ via a third output switch $S_B$; and an input terminal $V_{IN}$ selectively electrically connectable to the first node $V_{SW1}$ via an input switch $S_1$ between the first node $V_{SW1}$ and the input terminal $V_{IN}$.

2. The battery-charging voltage regulator of claim 1, wherein the first node $V_{SWI}$ and the second node $V_{SWX}$ are connected to the battery and connectable to a load.

3. A battery-charging voltage regulator, comprising:

an inductor $L_X$;

a battery $V_B$ in series with the inductor $L_X$, wherein the inductor is between a first node $V_{SW1}$ and a second node $V_{SWX}$ and the battery is between the second node $V_{SWX}$ and a third node $V_{SWB}$;

an output terminal $V_O$ selectively electrically connectable to the first node $V_{SW1}$ via a first output switch $S_{IO}$, to the second node $V_{SWX}$ via a second output switch $S_{XO}$ and to the third node $V_{SWB}$ via a third output switch $S_{BO}$; and an input terminal $V_{IN}$ selectively electrically connectable to the first node $V_{SW1}$ via an input switch $S_1$ between the first node $V_{SW1}$ and the input terminal $V_{IN}$.

4. The battery-charging voltage regulator of claim 3, wherein the first node $V_{SWI}$ is electrically connectable to ground via a first ground switch $S_{IG}$, the second node $V_{SWX}$ is electrically connectable to ground via a ground switch $S_{XG}$ and the third node $V_{SWB}$ is connectable to ground via a third ground switch $S_{BG}$.

5. The battery-charging voltage regulator of claim 4, wherein the inductor $L_X$ and the battery $V_B$ are configurable in a battery supply mode, a charge supply mode, and an input-supplied mode.

6. The battery-charging voltage regulator of claim 5, wherein in the battery supply mode, the output switch $S_{IO}$ is closed and the first ground switch $S_{IG}$, the first input switch $S_I$, the second output switch $S_{XO}$, and the third output switch $S_{BO}$ are open, wherein the second ground switch $S_{XG}$ is opened and the third ground switch $S_{XG}$ is closed during energizing duty cycle, and wherein the second ground switch $S_{XG}$ is closed and the third ground switch $S_{BG}$ is opened to transfer power from the battery to the output through the inductor.

7. The battery-charging voltage regulator of claim 5, wherein the charge supply mode comprises an energizing duty cycle and a draining duty cycle.

8. The battery-charging voltage regulator of claim 7, wherein, in the energizing duty cycle, the input switch $S_I$, second output switch $S_{XO}$ are closed such that the inductor is energized with $V_{IN}$-$V_O$.

9. The battery-charging voltage regulator of claim 8, wherein power is delivered to the output.

10. The battery-charging voltage regulator of claim 7, wherein, in the draining duty cycle, the first ground switch $S_{IG}$ and the third output switch $S_{BO}$ are on.

11. The battery-charging voltage regulator of claim 10, wherein power is delivered to both the battery $V_B$ and the output $V_O$.

12. The battery-charging voltage regulator of claim 5, wherein, in an alternative charge supply mode, the input switch $S_I$ and first ground switch $S_{IG}$ are switched and the third output switch $S_{BO}$ is closed such that both the output terminal and the battery receive power from the inductor, wherein the input switch $S_I$ is closed and the first ground switch $S_{IG}$ is open for energizing duty cycle, and wherein the input switch $S_I$ is opened and the first ground switch $S_{IG}$ is closed for draining duty cycle.

13. The battery-charging voltage regulator of claim 5, wherein, in the input-supplied mode, second output switch $S_{XO}$ is closed, and the first ground switch $S_{IG}$ and the input switch $S_I$ are switched with non-overlapping energizing and drain signals, such that the output terminal receives power from the inductor, wherein the input switch $S_I$ is closed and the first ground switch $S_{IG}$ is open during energizing, and wherein the input switch $S_I$ is open and the first ground switch $S_{IG}$ is closed during draining.

14. The battery-charging voltage regulator of claim 12, wherein the inductor is energized with $V_{IN}$-$V_O$ and drained with $V_O$.

15. The battery-charging voltage regulator of claim 4, wherein the inductor and the battery are configurable in a battery charging mode wherein the input switch $S_I$ and the first ground switch $S_{IG}$ are switched with non-overlapping energizing and drain signals and the third ground switch $S_{BG}$ is closed, such that the battery always receives power, and output does not receive power.

16. The battery-charging voltage regulator of claim 4, wherein the inductor and the battery are configurable in a battery charging mode wherein the input switch $S_I$, the third ground switch $S_{BG}$ are closed in the energizing duty cycle, and the first ground switch $S_{IG}$, third output switch $S_{BO}$ are closed in the draining duty cycle, such that the battery always receives power, and the output receives power during draining.

17. The battery charging voltage regulator of claim 4, further comprising a battery switch $S_{IB}$ between the third node $V_{SWB}$ and the input terminal $V_{IN}$.

18. The battery charging voltage regulator of claim 4, further comprising an output capacitance connected between the output terminal and ground.

19. The battery charging voltage regulator of claim 4, wherein the first output switch $S_{IO}$, the second output switch $S_{XO}$, the third output switch $S_{BO}$, the first ground switch $S_{IG}$, the second ground switch $S_{XG}$, third ground switch $S_{BG}$, and the input switch $S_I$ are each comprise metal-oxide semiconductors.

20. The battery charging voltage regulator of claim 19, wherein the second output switch $S_{XO}$ comprises a N-Type MOSFET; the first output switch $S_{IO}$ comprises a P-Type MOSFET; and the third output switch $S_{BO}$ comprises a P-Type MOSFET.

21. The battery-charging voltage regulator of claim 20, wherein in battery supply mode, the second ground switch $S_{XG}$ comprises an N-Type MOSFET, the third ground switch $S_{BG}$ comprises an N-Type MOSFET, wherein the second ground switch $S_{XG}$ and the third ground switch $S_{BG}$ are switched with non-overlapping energizing and drain signals, such that the battery supplies output to the output terminal $V_O$.

22. The battery charging voltage regulator of claim 20, wherein the input switch $S_I$ is a P-Type MOSFET with a first body connected to a first dynamic potential and the first output switch $S_{IO}$ is a P-Type MOSFET with a second body connected to a second dynamic potential, wherein the third ground switch $S_{BG}$ is a N-Type MOSFET with a third body connected to a third dynamic potential.

23. The battery charging voltage regulator of claim 22, wherein the first dynamic potential is the second dynamic potential.

24. The battery charging voltage regulator of claim 19, wherein the first ground switch $S_{IG}$, the second ground switch $S_{XG}$, and the second output switch $S_{XO}$ are MOSFET switches sharing a body connected to ground.

25. The battery charging voltage regulator of claim 19, wherein the third output switch $S_{BO}$ comprises a P-Type body connected to the output terminal $V_O$.

26. The battery charging voltage regulator of claim 19, further comprising a minimum voltage selector circuit between the third node $V_{SWB}$ and ground.

27. The battery charging voltage regulator of claim 19, further comprising a maximum voltage selector circuit between input terminal $V_{IN}$ and output terminal $V_O$.

28. The battery-charging voltage regulator of claim 3, wherein the first node $V_{SWI}$ and the second node $V_{SWX}$ are connected to the battery and connectable to a load.

* * * * *